United States Patent
Saito et al.

(10) Patent No.: US 10,246,592 B2
(45) Date of Patent: Apr. 2, 2019

(54) POWDER PAINT AND PAINTED ARTICLE

(71) Applicant: AGC Inc., Chiyoda-ku (JP)

(72) Inventors: Shun Saito, Chiyoda-ku (JP); Masataka Aikawa, Chiyoda-ku (JP)

(73) Assignee: AGC Inc., Chiyoda-ku (JP)

( * ) Notice: Subject to any disclaimer, the term of this patent is extended or adjusted under 35 U.S.C. 154(b) by 90 days.

(21) Appl. No.: 15/241,234

(22) Filed: Aug. 19, 2016

(65) Prior Publication Data
US 2016/0355690 A1 Dec. 8, 2016

Related U.S. Application Data

(63) Continuation of application No. PCT/JP2015/061495, filed on Apr. 14, 2015.

(30) Foreign Application Priority Data

Apr. 18, 2014 (JP) ................. 2014-086256

(51) Int. Cl.
| C09D 5/03 | (2006.01) |
| C09D 7/48 | (2018.01) |
| C09D 123/28 | (2006.01) |
| C09D 127/12 | (2006.01) |
| C09D 167/00 | (2006.01) |
| C09D 201/00 | (2006.01) |
| C09D 201/04 | (2006.01) |
| C23C 4/134 | (2016.01) |
| C23C 4/12 | (2016.01) |
| C09D 7/12 | (2006.01) |
| B05D 1/04 | (2006.01) |
| C08K 3/22 | (2006.01) |
| C08K 3/26 | (2006.01) |
| B05D 3/02 | (2006.01) |
| C08K 5/00 | (2006.01) |
| C08K 5/3435 | (2006.01) |

(52) U.S. Cl.
CPC ............ C09D 5/036 (2013.01); C09D 5/033 (2013.01); C09D 7/1241 (2013.01); C09D 7/48 (2018.01); C09D 123/28 (2013.01); C09D 127/12 (2013.01); C09D 167/00 (2013.01); C09D 201/00 (2013.01); C09D 201/04 (2013.01); C23C 4/12 (2013.01); C23C 4/134 (2016.01); B05D 1/04 (2013.01); B05D 3/0254 (2013.01); B05D 2202/25 (2013.01); C08K 3/22 (2013.01); C08K 5/005 (2013.01); C08K 5/3435 (2013.01); C08K 2003/2203 (2013.01); C08K 2003/2217 (2013.01); C08K 2003/262 (2013.01); C08K 2003/267 (2013.01)

(58) Field of Classification Search
CPC .......... C09D 5/033; C09D 5/036; C09D 7/48; C09D 201/00; C09D 201/04; C09D 167/00; C09D 127/12; C09D 123/28; C23C 4/134; C23C 4/12; C08K 5/005; C08K 5/3435; C08K 3/22; C08K 2003/267; C08K 2003/2217; C08K 2003/2203; C08K 2003/262; B05D 3/0254; B05D 2202/25; B05D 1/04
See application file for complete search history.

(56) References Cited

U.S. PATENT DOCUMENTS

| 2004/0176542 A1* | 9/2004 | Asakawa | ............. C09D 127/12 525/199 |
| 2004/0225060 A1* | 11/2004 | Yamauchi | ................. C08F 6/10 524/851 |
| 2006/0155007 A1 | 7/2006 | Huber | |
| 2014/0088248 A1* | 3/2014 | Kasahara | ............. C08F 214/18 524/768 |
| 2015/0072151 A1 | 3/2015 | Saito et al. | |

FOREIGN PATENT DOCUMENTS

| JP | 2002-206070 | 7/2002 | |
| JP | 2002-363446 | 12/2002 | |
| JP | 2003-96377 | 4/2003 | |
| JP | 2003-105269 | 4/2003 | |
| JP | 2003-105270 | 4/2003 | |
| JP | 2003-105290 A | 4/2003 | |
| JP | 2005-532467 | 10/2005 | |
| WO | WO2012165443 A1 * | 6/2012 | ............. C08L 27/12 |
| WO | WO 2014/002964 A1 | 1/2014 | |

OTHER PUBLICATIONS

CS Chem Prop Physical Property Report for bis(1,2,2,6,6-pentamethyl-4-piperidyl) sebacate, p. 1-2, report generated Mar. 31, 2018.*
International Search Report dated Jun. 23, 2015 in PCT/JP2015/061495, filed on Apr. 14, 2015.

* cited by examiner

Primary Examiner — Robert S Jones
(74) Attorney, Agent, or Firm — Oblon, McClelland, Maier & Neustadt, L.L.P.

(57) ABSTRACT

To provide a powder paint whereby an external defect such as orange-peel skin is less likely to be formed on a formed cured film. The powder paint is characterized by comprising: a fluororesin (A); from 2 to 60 mass ppm relative to the fluororesin (A), of at least one metal element (B) selected from a group comprising potassium, sodium, and magnesium; from 10 to 10,000 mass ppm relative to the fluororesin (A), of a light stabilizer (C); and from 10 to 5,000 mass ppm relative to the fluororesin (A), of a polymerization inhibitor (D).

12 Claims, No Drawings

POWDER PAINT AND PAINTED ARTICLE

This application is a continuation of PCT Application No. PCT/JP2015/061495, filed on Apr. 14, 2015, which is based upon and claims the benefit of priority from Japanese Patent Application No. 2014-086256 filed on Apr. 18, 2014. The contents of those applications are incorporated herein by reference in their entireties.

TECHNICAL FIELD

The present invention relates to a powder paint and a painted article.

BACKGROUND ART

In recent years, environmental pollution of global scale, such as global warming, ozone layer depletion, acid rain, is an international problem. For this reason, it has become an urgent need to establish measures against environmental pollution, and currently, various emission regulations are being carried out in each country from the point of view of environmental protection. Among them, since the problem of discharge into the atmosphere of organic solvents (VOC) is critical, reduction of organic solvents (de-VOC) is underway under enhanced VOC emission-control regulations, particularly in the paint industry.

Heretofore, VOC have been used for paints, but as de-VOC has been promoted, more recently, it has become common to widely use powder paints presenting little environmental impact, which contain no VOC at all and thus require no exhaust treatment or wastewater treatment and which can further be recovered and reused.

Previously, as raw materials for powder paints, acrylic resins, polyester resins or epoxy resins have been primarily used.

However, cured films formed by the powder paints containing them as raw materials, are not sufficient in weather resistance.

Under the circumstances, attention has been drawn to a fluororesin as a resin which can be used for a powder paint and is excellent in weather resistance.

As a powder paint composition containing a fluororesin, for example, a powder coating composition comprising a hydroxy group-containing fluororesin and a polyuretdione curing agent or a blocked isocyanate curing agent may be mentioned (Patent Document 1).

PRIOR ART DOCUMENT

Patent Document

Patent Document 1: JP-A-2003-105269

DISCLOSURE OF INVENTION

Technical Problem

However, if melt-kneading or the like is conducted by using a powder paint composition disclosed in Patent Document 1, the molecular weight of the hydroxy group-containing fluororesin tends to increase during the melt-kneading, and on a cured film to be formed from such a composition, abnormal appearance such as orange peel is likely to be formed.

It is an object of the present invention, to provide a powder paint capable of forming a cured film having excellent surface quality by preventing abnormal appearance such orange peel.

Solution to Problem

The present invention provides a powder paint and a painted article having the following constructions [1] to [13].

[1] A powder paint characterized by comprising
a fluororesin (A),
from 2 to 60 mass ppm relative to the fluororesin (A), of at least one metal element (B) selected from the group consisting of potassium, sodium and magnesium,
from 10 to 10,000 mass ppm relative to the fluororesin (A), of a light stabilizer (C) and,
from 10 to 5,000 mass ppm relative to the fluororesin (A), of a polymerization inhibitor (D).

[2] The powder paint according to the above [1], wherein the fluororesin (A) is at least one member selected from the group consisting of a polyvinylidene fluoride and a copolymer containing units based on a fluoroolefin and units having a reactive group.

[3] The powder paint according to the above [1] or [2], wherein the fluororesin (A) is a fluororesin having a glass transition temperature of at least 30° C.

[4] The powder paint according to any one of the above [1] to [3], wherein the fluororesin (A) has a number average molecular weight of from 3,000 to 50,000.

[5] The powder paint according to any one of the above [1] to [4], which further contains from 0.1 to 30 mass ppm relative to the fluororesin (A), of free chlorine atoms.

[6] The powder paint according to the above [5], wherein the mass ratio of the metal element (B) to the free chlorine atoms is from 1.0 to 10.0.

[7] The powder paint according to any one of the above [1] to [6], which further contains from 10 to 400 parts by mass of a non-fluororesin (E) per 100 parts by mass of the fluororesin (A).

[8] The powder paint according to any one of the above [1] to [7], wherein the light stabilizer (C) is a hindered amine light stabilizer having a molecular weight of from 300 to 5,000 and a melting point of from 50 to 250° C.

[9] The powder paint according to any one of the above [1] to [8], wherein the polymerization inhibitor (D) is a hydroquinone.

[10] The powder paint according to any one of the above [7] to [9], wherein the non-fluororesin (E) is an acrylic resin or a polyester resin.

[11] A painted article having a cured film of the powder paint as defined in any one of the above [1] to [10] on the surface of a substrate.

[12] The painted article according to the above [11], wherein the thickness of the cured film is from 100 to 1,000 μm.

[13] The painted article according to the above [11] or [12], wherein the water contact angle of the cured film is from 1 to 55°.

Advantageous Effects of Invention

According to the powder paint of the present invention, it is possible to prevent an increase in the molecular weight of the fluororesin during the production of the powder paint; a cured film to be formed will have an excellent surface quality; and it is possible to prevent abnormal appearance such as orange peel.

DESCRIPTION OF EMBODIMENTS

The following definitions of terms are applicable throughout the specification including Claims.

A "glass transition temperature" means the mid-point glass transition temperature measured by a differential scanning calorimetry (DSC) method.

A "fluororesin" means a polymer compound having fluorine atoms in the molecule.

A "non-fluororesin" means a polymer compound having no fluorine atom in the molecule.

A "cured film" means a film formed by applying and curing a powder paint.

A "(meth) acrylate" is a generic term for an acrylate and methacrylate.

A "unit" is a moiety based on a monomer constituting the structure of a polymer, and refers to a structural unit formed by polymerization of the monomer or a structural unit obtained by chemically converting such a structural unit. For example, in a case where a polymer is one to be formed by addition polymerization of a monomer having a carbon-carbon unsaturated double bond, a unit of the polymer is a divalent unit formed by cleavage of the carbon-carbon unsaturated double bond of the monomer by the polymerization reaction.

[Powder Paint]

The powder paint of the present invention is characterized by comprising the fluororesin (A), at least one metal element (B) selected from the group consisting of potassium, sodium and magnesium, a light stabilizer (C) and a polymerization inhibitor (D) and, as the case requires, a non-fluororesin (F), additives, etc.

(Fluororesin (A))

The fluororesin (A) may, for example, be a homopolymer or copolymer having units based on a fluoroolefin.

The fluoroolefin is a compound having at least one hydrogen atom in a hydrocarbon olefin (general formula $C_nH_{2n}$) substituted by a fluorine atom.

The number n of carbon atoms in the fluoroolefin is preferably from 2 to 8, particularly preferably from 2 to 6.

The number of fluorine atoms in the fluoroolefin is preferably at least 2, particularly preferably 3 or 4. When the number of fluorine atoms is at least 2, the cured film will be excellent in weather resistance.

In the fluoroolefin, at least one hydrogen atom not substituted by a fluorine atom may be substituted by a chlorine atom. When the fluoroolefin has chlorine atom(s), it becomes easy to disperse a pigment (especially a colored organic pigment such as cyanine blue or cyanine green), etc. in the fluororesin (A). Further, the glass transition temperature of the fluororesin (A) can be designed to be at least 30° C., and blocking of a cured film can be suppressed.

As the fluoroolefin, at least one member selected from the group consisting of tetrafluoroethylene (hereinafter referred to as "TFE"), chlorotrifluoroethylene (hereinafter referred to as "CTFE"), hexafluoropropylene and vinyl fluoride is preferred, and TFE or CTFE is particularly preferred.

One of such fluoroolefins may be used alone or two or more of them may be used in combination.

When the fluororesin (A) is a homopolymer having units based on a fluoroolefin, it may, for example, be polyvinylidene fluoride (hereinafter referred to as "PVDF"), polyvinyl fluoride, polychlorotrifluoride, etc., and PVDF is particularly preferred in that it is excellent in adhesion to a substrate (especially to an aluminum substrate), and it can easily be fixed on an aluminum curtain wall with a sealing agent.

When the fluororesin (A) is a copolymer having units based on a fluoroolefin, it is preferably a copolymer having units based on a fluoroolefin and units having a reactive group, in that it is excellent in antifouling property, water resistance, acid resistance, alkali resistance, etc. Further, it may have other units (hereinafter referred to as "other units") in addition to units based on a fluoroolefin and units having a reactive group.

The units having a reactive group, may be units obtained by polymerizing a monomer having a reactive group, or units having some or all of units chemically convertible to form reactive groups, in a copolymer, chemically converted to form reactive groups. The units having a reactive group may be of one type, or of two or more types.

The reactive group may, for example, be a hydroxy group, a carboxy group, an amino group. etc. Among them, a hydroxy group or a carboxy group is preferred as the reactive group, since in the case of using an isocyanate-type curing agent (especially a blocked isocyanate-type curing agent) as the curing agent, the curing speed will be excellent, it becomes easy to disperse a pigment, etc., and it is possible to obtain a cured film with a high gloss (60° gloss being at least 60%).

A unit having a hydroxy group may be a unit obtained by polymerizing a monomer having a hydroxy group. For example, allyl alcohol, a hydroxyalkyl vinyl ether (2-hydroxyethyl vinyl ether, 4-hydroxybutyl vinyl ether, cyclohexanediol monovinyl ether, etc.), a hydroxyalkyl allyl ether (2-hydroxyethyl allyl ether, etc.), a vinyl hydroxy alkanoate (vinyl hydroxypropionate, etc.), a hydroxyalkyl (meth)acrylate (hydroxyethyl (meth)acrylate, etc.), etc. may be mentioned.

A unit having a carboxy group may, for example, be a unit obtained by polymerizing a monomer having a carboxy group, or a unit having a carboxyl group that is formed by chemical conversion. For example, (meth)acrylic acid, a carboxyl alkyl vinyl ether, carboxyl allyl ether, etc. may be mentioned.

As a method of forming a unit having a carboxy group by a chemical conversion, preferred is a method of copolymerizing the above monomer having a hydroxy group to form a unit having a hydroxy group, followed by an esterification reaction of an acid anhydride to the hydroxy group to obtain a unit having a carboxy group.

The acid anhydride is preferably a compound having a molecular weight of from 90 to 200, preferably a compound having from 4 to 15 carbon atoms, preferably a compound having a melting point of from 20 to 180° C., from the viewpoint of excellent reactivity with the hydroxyl group.

The acid anhydride may be a dibasic acid anhydride. For example, succinic anhydride (molecular weight: 100.1, melting point: 120° C., the number of carbon atoms: 4), glutaric anhydride (molecular weight: 114.1, melting point: 52° C., the number of carbon atoms: 5), itaconic anhydride (molecular weight: 112.1, melting point: 67° C., the number of carbon atoms: 5), anhydrous 1,2-cyclohexane dicarboxylic acid (hexahydrophthalic anhydride) (molecular weight: 154.0, melting point: 35° C., the number of carbon atoms: 8), anhydrous cis-4-cyclohexene-1,2-dicarboxylic acid (molecular weight: 152.0, melting point: 66° C., the number of carbon atoms: 8), phthalic anhydride (molecular weight: 148.1, melting point: 131° C., the number of carbon atoms: 8), 4-methylhexahydrophthalic anhydride (molecular weight: 168.0, melting point: 22° C., the number of carbon atoms: 9), anhydrous 1,8-naphthalic acid (molecular weight: 198.2, melting point: 17° C., the number of carbon atoms:

11), maleic anhydride (molecular weight: 98.1, melting point: 52.6° C., the number of carbon atoms: 4), etc. may be mentioned.

As the dibasic acid anhydride, succinic anhydride is particularly preferred from the viewpoint of the solubility and reactivity with a hydroxyl group.

Other units may, for example, be units based on a fluorinated monomer other than a fluoroolefin, or units based on other monomers having no fluorine atom and no reactive group (hereinafter referred to as "other monomers").

The fluorinated monomer other than a fluoroolefin may, for example, be a fluoro(alkyl vinyl ether), etc.

Other monomers are preferably vinyl-type monomers, since they are excellent in alternating copolymerizability with a fluoroolefin, and it is possible to increase the polymerization yield.

Further, the vinyl-type monomers are preferred, since even when remained as unreacted, they present little influence on the cured film, and they can easily be removed in the production process.

As such vinyl monomers, for example, vinyl ethers, allyl ethers, alkyl vinyl esters, alkyl allyl esters, olefins, etc. may be mentioned.

The vinyl ethers may, for example, be cycloalkyl vinyl ethers (such as cyclohexyl vinyl ether (hereinafter referred to as "CHVE".), etc.), alkyl vinyl ethers (such as nonyl vinyl ether, 2-ethylhexyl vinyl ether, hexyl vinyl ether, ethyl vinyl ether, n-butyl vinyl ether, tert-butyl vinyl ether, etc.), etc.

The allyl ethers may, for example, be alkyl allyl ethers (such as ethyl allyl ether, hexyl allyl ether, etc.).

The alkyl vinyl esters may, for example, be vinyl esters of carboxylic acids (such as acetic acid, butyric acid, pivalic acid, benzoic acid, propionic acid, etc.). Also, as a vinyl ester of a carboxylic acid having a branched alkyl group, commercially available VeoVa-9, VeoVa-10 (both manufactured by Shell Chemical Co., trade names), etc. may be used.

The alkyl allyl esters may, for example, be allyl esters of carboxylic acids (such as acetic acid, butyric acid, pivalic acid, benzoic acid, propionic acid, etc.).

The olefins may, for example, be ethylene, propylene, isobutylene, etc.

As other units, units based on a cycloalkyl vinyl ether are preferred, and units based on CHVE are particularly preferred, whereby the glass transition temperature of the fluororesin (A) can be designed to be at least 30° C., and it is possible to suppress blocking of the cured film.

As other units, preferred are units having a linear or branched alkyl group having 3 or more carbon atoms from the viewpoint of excellent flexibility of the cured film.

As other units, one type may be used alone, or two or more types may be used in combination.

The fluororesin (A) may, for example, be a TFE-perfluoro (alkyl vinyl ether) copolymer (hereinafter referred to as "PFA"), a TFE-hexafluoropropylene copolymer, a TFE-perfluoro(alkyl vinyl ether)-hexafluoropropylene copolymer, an ethylene-TFE copolymer (hereinafter referred to as "ETFE"), an ethylene-CTFE copolymer, etc.

Among them, as a combination of monomers forming the units constituting the fluororesin (A), the following combination (1) is preferred, combination (2) is more preferred, and combination (3) is particularly preferred, from the viewpoint of weather resistance, adhesion, flexibility, blocking resistance, etc.
Combination (1)
    Fluoroolefin: TFE or CTFE,
    Monomer having a hydroxy group: hydroxyalkyl vinyl ether,
    Other monomers: at least one member selected from a cycloalkyl vinyl ether, an alkyl vinyl ether and an alkyl vinyl ester.
Combination (2)
    Fluoroolefin: TFE or CTFE,
    Monomer having a hydroxy group: hydroxyalkyl vinyl ether,
    Other monomers: CHVE or tert-butyl ether.
Combination (3)
    Fluoroolefin: CTFE,
    Monomer having a hydroxy group: hydroxyalkyl vinyl ether,
    Other monomers: CHVE or tert-butyl ether.

The proportion of units based on a fluoroolefin, is preferably from 30 to 70 mol %, particularly preferably from 40 to 60 mol %, in all units (100 mol %) in the copolymer. When the proportion of the units based on a fluoroolefin is at least the above lower limit value, the cured film will be excellent in weather resistance. When the proportion of the units based on a fluoroolefin is at most the above upper limit value, in a case where the cured film has a single layer structure, it will be excellent in adhesion between the layer and the substrate, and in a case where the cured film has a two-layer structure, it will be excellent in adhesion between a layer formed by the fluororesin (A) and a layer formed by the non-fluororesin (E).

The proportion of units having a reactive group is preferably from 0.5 to 20 mol %, particularly preferably from 1 to 15 mol %, in all units (100 mol %) in the copolymer. When the proportion of the units having a reactive group is at least the above lower limit value, in a case where the cured film has a single layer structure, it will be excellent in adhesion between the layer and the substrate, and in a case where the cured film has a two-layer structure, it will be excellent in adhesion between a layer formed by the fluororesin (A) and a layer formed by the non-fluororesin (E). When the proportion of the units having a reactive group is at most the above upper limit value, scratch resistance of the cured film will be excellent.

The proportion of other units is preferably from 20 to 60 mol %, particularly preferably from 30 to 50 mol %, in all units (100 mol %) in the copolymer. When the proportion of other units is at least the above lower limit value, the glass transition temperature of the fluororesin (A) can be set in an appropriate range, and it is easy to produce a powder paint. When the proportion of other units is at most the above upper limit value, in a case where the cured film has a single layer structure, it will be excellent in adhesion between the layer and the substrate, and in a case where the cured film has a two-layer structure, it will be excellent in adhesion between a layer formed by the fluororesin (A) and a layer formed by the non-fluororesin (E).

The proportions of these units substantially coincide with the charged amounts at the time of polymerization.

The melting point of the fluororesin (A) is preferably at most 300° C., more preferably at most 200° C., particularly preferably at most 180° C. When the melting point of the fluororesin (A) is at most the above upper limit value, the surface smoothness of the cured film will be further excellent. Usually, the melting point is at least 35° C.

The lower limit of the glass transition temperature of the fluororesin (A) is preferably at least 30° C., particularly preferably at least 35° C., whereby it will be easy to produce a powder paint, and it will be easy to prevent blocking.

On the other hand, the upper limit of the glass transition temperature of the fluororesin (A), is preferably at most 150° C., more preferably at most 120° C., particularly preferably at most 100° C., from such a viewpoint that it is possible to further improve the surface smoothness of the formed cured film.

The number average molecular weight of the fluororesin (A) is preferably from 3,000 to 50,000, particularly preferably from 5,000 to 30,000. When the number average molecular weight is at least the above lower limit value, the cured film will be excellent in water resistance, salt water resistance, etc. When the number average molecular weight is at most the upper limit value, the surface smoothness of the cured film will be more excellent.

In a case where the fluororesin (A) has reactive groups such as hydroxy groups whereby it is possible to measure the hydroxy value, the hydroxy value is preferably from 5 to 100 mgKOH/g, particularly preferably from 10 to 80 mgKOH/g. When the hydroxy value is at least the above lower limit value, in a case where the cured film has a single layer structure, it will be excellent in adhesion between the layer and the substrate, and in a case where the cured film has a two layer structure, it will be excellent in adhesion between a layer formed by the fluororesin (A) and a layer formed by the non-fluororesin (E). When the hydroxy value is at most the above upper limit value, the cured film will be excellent in crack resistance under temperature cycles between a high temperature of at least 100° C. and a low temperature of at most 10° C. Measurement of the hydroxy value is carried out in accordance with JIS K1557-1 (2007 edition).

In a case where the fluororesin (A) has carboxy groups, the acid value of the fluororesin (A) is preferably from 0.1 to 50 mgKOH/g, more preferably from 1.0 to 4.0 mgKOH/g. When the acid value of the fluororesin (A) is at least the above lower limit value, it will be effective in improving dispersibility of a pigment, and when it is at most the above upper limit value, the cured film will be excellent in moisture resistance. Measurement of the acid value is conducted in accordance with JIS K5601-2-1 (2009).

In a case where the fluororesin (A) or the non-fluororesin (E) in the powder paint of the present invention is a polymer containing units having chlorine atoms, it is possible that in the resin structure of the powder paint, chlorine atoms present as not chemically bonded (hereinafter referred to as "free Cl") are likely to be contained. Such free Cl is considered to be primarily derived from chlorine atoms contained in a chlorinated monomer as a raw material of the resin, or from chlorine components contained as impurities in chemical structures of other additive components or in the respective components of the resin.

In what form such free Cl is present in the fluororesin (A), is not necessarily clearly understood, but a form of a metal salt may, for example, be conceivable. When free Cl is present, it is likely to increase the molecular weights of the fluororesin (A) and other resins contained in the powder paint, and as a result, likely to cause impairment of the quality of the film surface formed from the powder paint.

Therefore, in the present invention, the amount of free Cl in the powder paint is preferably controlled to be at a low level. The amount of free Cl is preferably from 0.1 to 30 mass ppm, more preferably from 0.5 to 25 mass ppm, particularly preferably from 1.0 to 22.0 mass ppm, to the fluororesin (A). When the amount of free Cl is at least the above lower limit value, orange peel of the cured film is less likely to be formed, and when it is at most the upper limit value, the cured film is less likely to be colored.

For the amount of free Cl, the powder paint may dissolved in an organic solvent capable of dissolving the resin component, then the organic solvent may extracted with water to obtain an aqueous layer, whereupon the amount of chlorine ions contained in the aqueous layer may be quantified by e.g. an ion chromatography method.

(Metal Element (B))

The powder paint of the present invention contains a specific amount of at least one metal element selected from the group consisting of potassium, sodium and magnesium, as the metal element (B). Potassium, sodium and magnesium are incorporated into the powder paint in the form of metal salts.

The metal salts may, for example, be potassium salts such as potassium carbonate, potassium hydroxide, potassium bicarbonate, potassium methoxide, potassium ethoxide, potassium phosphate, etc.; sodium salts such as sodium hydroxide, sodium hydrogen carbonate, sodium carbonate, sodium methoxide, sodium ethoxide, sodium phosphate, etc.; magnesium salts such as magnesium hydroxide, magnesium carbonate, magnesium phosphate, etc.

In a case where the metal salt is incorporated into the powder paint of the present invention, the form of the metal salt present in the powder paint is not particularly limited, and it may be present in various forms, for example, in the form of a metal salt as it is, or in the form as chemically bonded to another component.

The concentration of the metal element (B) in the powder paint is from 2.0 to 60 mass ppm, preferably from 2.1 to 50 mass ppm, more preferably from 2.2 to 40 mass ppm, to the fluororesin (A). When the concentration of the metal element (B) is at least the above lower limit value, even if melt kneading is repeated in a plurality of times in the production, increase in the molecular weight of the fluororesin (A) tends to be small, and the stability of the powder paint tends to be high. On the other hand, when it is at most the above upper limit value, a haze of the cured film is less likely to occur.

Further, the mass ratio of the metal element (B) to free Cl is preferably from 1.0 to 10.0, more preferably from 1.1 to 9.0, particularly preferably from 1.2 to 8.0. When the mass ratio is at least the above lower limit value, even if the melt-kneading temperature is made to be as high as at least 200° C., it is possible to suppress increase in the molecular weight of the fluororesin (A). On the other hand, when it is at most the above upper limit value, a tough cured film can be obtained.

(Light Stabilizer (C))

The powder paint of the present invention contains a light stabilizer (C) in a specific amount. The light stabilizer (C) is one to be incorporated in order to prevent degradation of the resins (the fluororesin (A) and the non-fluororesin (E)) in the cured film. For example, by capturing radical species generated in a cured film by ultraviolet light, it is possible to prevent further deterioration.

As the light stabilizer (C), preferred is a hindered amine light stabilizer having a number-average molecular weight of from 300 to 5,000 and a melting point of from 50 to 250° C., since it will be thereby readily locally distributed in the layer formed by the non-fluororesin (E) during the curing process. From such a viewpoint that it can be readily uniformly diffused in the powder paint during kneading, a hindered amine light stabilizer having a molecular weight of from 400 to 4,000 and a melting point of from 60 to 200° C. is particularly preferred.

As the light stabilizer (C), one type may be used alone, or two or more types may be used in combination.

Commercially available hindered amine light stabilizers may, for example, be "Tinuvin (registered trademark) 111FDL" (molecular weight: 2,000 to 4,000, melting point: 63° C.), "Tinuvin (registered trademark) 144" (molecular weight: 685, melting point: 146 to 150° C.), "Tinuvin (registered trademark) 152" (molecular weight: 756.6, melting point: 83 to 90° C.), manufactured by BASF; "Sanduvor (registered trademark) 3051 powder" (molecular weight: 364.0, melting point: 225° C.), "Sanduvor (registered trademark) 3070 powder" (molecular weight: 1,500, melting point: 148° C.), "VP Sanduvor (registered trademark) PR-31" (molecular weight: 529, melting point: 120 to 125° C.), manufactured by Clariant; etc.

The concentration of the light stabilizer (C) in the powder paint is from 10 to 10,000 mass ppm, preferably from 100 to 5,000 mass ppm, more preferably from 500 to 3,000 mass ppm, to the fluororesin (A). When the concentration of the light stabilizer (C) is at least the above lower limit value, orange peel is less likely to be formed in the cured film, and on the other hand, when it is at most the above upper limit value, in a case where cyanine blue is added, the dark blue paint color is less likely to be yellowish.

(Polymerization Inhibitor (D))

The powder paint of the present invention contains a specific amount of a polymerization inhibitor (D). The polymerization inhibitor (D) in the powder paint may, for example, be a polymerization inhibitor of e.g. a hydroquinone-type, catechol-type, anthraquinone-type, phenothiazine-type, hydroxy toluene-type, etc. Among them, a hydroquinone-type polymerization inhibitor is preferred, and hydroquinone is particularly preferred, since it is thereby easy to prevent increase in the molecular weight of the fluororesin (A).

The concentration of the polymerization inhibitor (D) in the powder paint is from 10 to 5,000 mass ppm, preferably from 50 to 3,000 mass ppm, more preferably from 100 to 2,000 mass ppm, to the fluororesin (A). When the concentration of the polymerization inhibitor (D) is at least the above lower limit value, in a case where the polymerization inhibitor (D) is added during the polymerization reaction of the resin, it tends to be easy to prevent generation of free Cl from the resin, and on the other hand, when it is at most the above upper limit, the cured film is less likely to be colored.

(Non-Fluororesin (E))

The powder paint of the present invention may contain resins other than the fluororesin (A). As the resins other than the fluororesin (A), a fluororesin other than the fluororesin (A), and a non-fluororesin (E) may be mentioned, and a non-fluororesin (E) is preferred.

The non-fluororesin (E) may, for example, be at least one member selected from the group consisting of an acrylic resin, a polyester resin, an urethane resin, an epoxy resin and a silicone resin. Among them, an acrylic resin or a polyester resin is preferred, and a polyester resin is particularly preferred, because of excellent adhesion to a substrate, and since the fluororesin (A) and the non-fluororesin (E) tend to readily undergo phase separation when formed into a cured film, and from the viewpoint of excellent light resistance. Preferably, the polyester resin is particularly preferred.

<Acrylic Resin>

The acrylic resin is a polymer having units based on a (meth) acrylate. The acrylic resin may, for example, be an acrylic resin having a reactive group such as a carboxy group, a hydroxy group, a sulfo group, etc. The acrylic resin can improve the dispersibility of a pigment.

The glass transition temperature of the acrylic resin is preferably from 30 to 60° C. When the glass transition temperature is at least the above lower limit value, blocking is less likely to occur, and when it is at most the above upper limit value, the surface smoothness of the cured film will be more excellent.

The number average molecular weight of the acrylic resin is preferably from 5,000 to 100,000, particularly preferably from 30,000 to 100,000. When the number average molecular weight of the acrylic resin is at least the above lower limit value, blocking is less likely to occur, and when it is at most the above upper limit value, it is possible to further improve the surface smoothness of the cured film.

The mass average molecular weight of the acrylic resin is preferably from 6,000 to 150,000, more preferably from 40,000 to 150,000, particularly preferably from 60,000 to 150,000. When the mass average molecular weight of the acrylic resin is at least the above lower limit value, blocking is less likely to occur, and when it is at most the above upper limit, it is possible to further improve the surface smoothness of the cured film.

In a case where the acrylic resin has carboxy groups, the acid value of the acrylic resin is preferably from 150 to 400 mgKOH/g. When the acid value of the acrylic resin is at least the above lower limit value, it is effective in improving dispersibility of a pigment, and when it is at most the above upper limit, the cured film will be excellent in moisture resistance.

Commercially available acrylic resins may, for example, be "FINEDIC (registered trademark) A-249", "FINEDIC (registered trademark) A-251" and "FINEDIC (registered trademark) A-266", manufactured by DIC Corp.; "ALMATEX (registered trademark) PD6200" and "ALMATEX (registered trademark) PD7310", manufactured by Mitsui Chemicals, Inc.; "SANPEX PA-55" manufactured by Sanyo Chemical Industries Ltd.; etc.

<Polyester Resin>

The polyester resin has units based on a dehydration reaction product of a polyvalent carboxylic acid compound and a polyhydric alcohol compound, and as the case requires, may have units other than these two types of units (such as units based on a hydroxycarboxylic acid compound). The polyester resin has at least either a carboxy group or a hydroxy group at terminals of the polymer chain.

The polyvalent carboxylic acid compound may, for example, be phthalic acid, isophthalic acid, terephthalic acid, naphthalene dicarboxylic acid, trimellitic acid, pyromellitic acid, phthalic anhydride, etc., and isophthalic acid is preferred in that the cured film will be thereby excellent in weather resistance.

As the polyhydric alcohol compound, an aliphatic polyhydric alcohol or an alicyclic polyhydric alcohol is preferred, and an aliphatic polyhydric alcohol is more preferred, from the viewpoint of excellent adhesion to a substrate and excellent flexibility of the cured film.

The polyhydric alcohol compound may, for example, be ethylene glycol, diethylene glycol, triethylene glycol, 1,2-propanediol, 1,3-propanediol, 1,3-butanediol, 1,4-butanediol, 1,2-pentanediol, 1,5-pentanediol, neopentyl glycol, spiro glycol, 1,10-decanediol, 1,4-cyclohexanedimethanol, trimethylolethane, trimethylolpropane, glycerol, pentaerythritol, etc.

As the polyhydric alcohol, neopentyl glycol, 1,2-pentanediol, 1,5-pentanediol, trimethylol propane or the like, is preferred, and from the viewpoint of ease of availability, neopentyl glycol or trim ethylolpropane, is particularly preferred.

Commercially available polyester resins may, for example, be "CRYLCOAT (registered trademark) 4642-3" and "CRYLCOAT (registered trademark) 4890-0", manufactured by DAICEL-ALLNEX LTD.; "GV-250", "GV-740" and "GV-175", manufactured by Japan U-PICA Co., Ltd.; etc.

<Urethane Resin>

The urethane resin may be a mixture obtained by mixing, or a resin obtained by reacting, a polyol (such as acrylic polyol, polyester polyol, polyether polyol, propylene glycol, propylene oxide, etc.) and an isocyanate compound. In the present invention, it is preferred to use an urethane resin comprising a powdery polyol (acrylic polyol, polyester polyol or polyether polyol) and a powdery isocyanate compound.

<Epoxy Resin>

The epoxy resin may, for example, be a bisphenol A epoxy resin, a bisphenol F type epoxy resin, etc.

Commercially available epoxy resins may, for example, be "EPIKOTE (registered trademark) 1001", "EPIKOTE (registered trademark) 1002" and "EPIKOTE (registered trademark) 4004P", manufactured by Mitsubishi Chemical Corporation; "EPICLON (registered trademark) 1050" and "EPICLON (registered trademark) 3050", manufactured by DIC Corporation; "EPOTOHTO (registered trademark) YD-012" and "EPOTOHTO (registered trademark) YD-014", manufactured by Nippon Steel & Sumikin Chemical Co., Ltd.; "Denacol (registered trademark) EX-711", manufactured by Nagase ChemteX Corporation; "EHPE3150" manufactured by Daicel Corporation, Ltd.; etc.

<Silicone Resin>

The silicone resin may be one having a branched structure and having silanol groups (Si—OH) as reactive groups which undergo dehydration condensation with each other for curing, to form, after curing, a cured film having a three-dimensional crosslinked structure. Otherwise, a silicone resin having a relatively low molecular weight (a silicone resin intermediate for modification) and another thermosetting resin (such as an alkyd resin, a polyester resin, an epoxy resin, an acrylic resin, etc.) may be used in combination.

Commercially available silicone resins may, for example, be "GLASCA HPC-7506", manufactured by JSR Corporation; "Zemrack (registered trademark)", manufactured by Kaneka Corporation, "SILIKOPON (registered trademark) EF", "SILIKOPON (registered trademark) EW", "SILIKOPON (registered trademark) EC" and "SILIKOPON™ ED", manufactured by Evonik; etc.

The powder paint preferably contains from 10 to 400 parts by mass of a non-fluororesin (E) and particularly preferably contains from 20 to 300 parts by mass of a non-fluororesin (E), per 100 parts by mass of the fluororesin (A). When the concentration of the non-fluororesin (E) is at least the above lower limit value, even if the aluminum substrate is one treated with a chromium-free chemical treatment agent, it is possible to secure the adhesion to the substrate. On the other hand, when the concentration of the non-fluororesin (E) is at most the above upper limit value, the cured film will be excellent in weather resistance.

(Other Components)

The powder paint of the present invention preferably contains, in addition to the above-described components, components for the purpose of improving the surface smoothness, weather resistance, durability, etc. of the cured film, as additives. As such additives, a curing agent, a curing catalyst, a pigment, an ultraviolet absorber, a surface adjusting agent (leveling agent), a degassing agent, a plasticizer, etc. may be mentioned. Further, depending on the particular purpose, it may further contain a nonionic, cationic or anionic surfactant, a silane coupling agent, a matting agent such as ultrafine synthetic silica, a filler, a heat stabilizer, a thickener, a dispersing agent, a charge inhibitor, a rust inhibitor, an antifouling agent, a water repellent agent, a low-staining treatment agent, etc.

The powder paint of the present invention preferably contains a curing agent and a curing catalyst, as additives, since a cured film is thereby easily obtainable.

The content of the additives may be suitably adjusted within a range not to impair the effects of the present invention, and it is usually preferably from 0.01 to 70 mass %, more preferably from 0.05 to 60 mass %, to the total amount (100 mass %) of the powder paint. Among the additives, the content of additives, etc. other than the pigment and the curing agent, is preferably from 0.01 to 10 mass %, more preferably from 0.05 to 5 mass %, to the total amount (100 mass %) of the powder paint.

<Curing Agent>

The curing agent is a compound which reacts with reactive groups of the resin (the fluororesin (A) or non-fluororesin (E)), to cross-link the resin or to increase its molecular weight thereby to cure the resin. The curing agent is preferably used in a case where the resin has reactive groups, and it is preferred to select one having two or more reactive groups which are reactive with the reactive groups (hydroxy groups, carboxy groups, etc.) of the resin.

Further, the reactive groups of the curing agent are preferably ones which are less likely to react with the reactive groups of the resin at normal temperature conditions, and which are reactive when the powder paint is heated and melted. For example, at the time of selecting isocyanate groups as the reactive groups of the curing agent, it is preferred to select blocked isocyanate groups rather than isocyanate groups having a higher reactivity at room temperature. When the powder paint is heated and melted, blocked isocyanate groups become isocyanate groups as the blocking agent is desorbed, and the isocyanate groups will then act as reactive groups.

As such a curing agent, a known compound may be used. For example, a blocked isocyanate curing agent, an amine type curing agent (melamine resin, guanamine resin, sulfonamide resin, urea resin, aniline resin, etc.), a (3-hydroxyalkylamide curing agent, a triglycidyl isocyanurate curing agent, etc. may be mentioned. A blocked isocyanate curing agent is particularly preferred in that adhesion to a substrate, processability of a product after coating, water resistance of a cured film, etc. will be thereby excellent.

In a case where the fluororesin (A) has hydroxy groups as reactive groups, the curing agent is preferably a blocked isocyanate curing agent.

In a case where the fluororesin (A) has only carboxy groups as reactive groups, the curing agent is preferably a p-hydroxyalkylamide curing agent, or a triglycidyl isocyanurate curing agent.

As the curing agent, one type may be used alone, or two or more types may be used in combination.

The softening temperature of the curing agent is preferably from 10 to 120° C., particularly preferably from 40 to 100° C. When the softening temperature is at least the above lower limit value, the powder paint is less likely to be cured at room temperature, and particulate agglomerates are less likely to be formed. When the softening temperature is at most the above upper limit value, when raw material is melt-kneaded to produce a powder, the curing agent will be easily homogeneously dispersed in the powder, the surface smoothness of the cured film to be formed will be better, and in addition, the cured film will be excellent in strength, moisture resistance, etc.

The blocked isocyanate curing agent is preferably one which is solid at room temperature.

The blocked isocyanate curing agent is preferably one which is produced by reacting an aliphatic, aromatic or araliphatic diisocyanate and a low-molecular compound having active hydrogen to obtain a polyisocyanate, which is then reacted with a blocking agent for masking.

The diisocyanate may, for example, be tolylene diisocyanate, 4,4'-diphenylmethane diisocyanate, xylylene diisocyanate, hexamethylene diisocyanate, 4,4'-methylenebis(cyclohexyl isocyanate), methylcyclohexane diisocyanate, bis(isocyanatomethyl) cyclohexane isophorone diisocyanate, dimer acid diisocyanate, lysine diisocyanate, etc.

The low molecular compound having active hydrogen may, for example, be water, ethylene glycol, propylene glycol, trimethylolpropane, glycerin, sorbitol, ethylenediamine, ethanolamine, diethanolamine, hexamethylenediamine, isocyanurate, uretdione, a low molecular weight polyester having hydroxy groups, polycaprolactone, etc.

The blocking agent may, for example, be an alcohol (methanol, ethanol, benzyl alcohol, etc.), a phenol (phenol, cresol etc.), a lactam (caprolactam, butyrolactam, etc.), an oxime (cyclohexanone, oxime, methyl ethyl ketoxime, etc.), etc.

<Curing Catalyst>

The curing catalyst is one which promotes the curing reaction and imparts excellent chemical properties and physical properties to the cured film.

For example, in a case where the powder paint contains a blocked isocyanate curing agent, the curing catalyst is preferably a tin catalyst (stannous octoate, tributyltin laurate, dibutyltin dilaurate, etc.).

As the curing catalyst, one type may be used alone, or two or more types may be used in combination.

<Pigment>

The pigment is preferably at least one member selected from the group consisting of a luster pigment, an anticorrosive pigment, a coloring pigment and an extender pigment.

The luster pigment is a pigment for lustering a cured film. The luster pigment may, for example, be aluminum powder, nickel powder, stainless steel powder, copper powder, bronze powder, gold powder, silver powder, mica powder, graphite powder, glass flakes, scale-like iron oxide powder, etc.

The anticorrosive pigment is a pigment for preventing corrosion or deterioration of a substrate which is required to have corrosion resistance. As the anticorrosive pigment, a lead-free anticorrosive pigment is preferred which presents little impact on the environment. The lead-free anti-corrosive pigment may, for example, be zinc cyanamide, zinc oxide, zinc phosphate, calcium magnesium phosphate, zinc molybdate, barium borate, zinc calcium cyanamide, etc.

The coloring pigment is a pigment for coloring the cured film. The coloring pigment may, for example, be titanium oxide, carbon black, iron oxide, phthalocyanine blue, phthalocyanine green, quinacridone, isoindolinone, benzimidazolone, dioxazine, etc.

The extender pigment is a pigment to improve the hardness of the cured film and to increase the thickness of the cured film. Further, it is preferably incorporated in that when the substrate is cut, the cut surface of the cured film can be made clean. The extender pigment may, for example, be talc, barium sulfate, mica, calcium carbonate, etc.

<Ultraviolet Absorber>

As the ultraviolet absorber, any ultraviolet absorber selected from organic ultraviolet absorbers and inorganic ultraviolet absorbers may be used.

As the ultraviolet absorber, one type may be used alone, or two or more types may be used in combination.

The organic ultraviolet absorbents may, for example, be salicylate ultraviolet absorbers, benzotriazole ultraviolet absorbers, benzophenone ultraviolet absorbers, cyanoacrylate ultraviolet absorbers, etc.

As the organic ultraviolet absorber, a compound having a molecular weight of from 200 to 1,000 is preferred. When the molecular weight is at least 200, it is possible to remain in the cured film without being volatilized in the melting and curing process of the powder paint. When the molecular weight is at most 1,000, in a case where the cured film has a two-layer structure, it can remain in the layer formed by the fluororesin (A).

As the organic ultraviolet absorber, a compound having a melting point of from 50 to 150° C. is preferred. When the melting point is at least 50° C., it is possible to remain in the cured film without being volatilized in the melting and curing process of the powder paint. When the melting point is at most 150° C., it tends to be easily melted in the melting and curing process of the powder paint, and in a case where the cured film has a two-layer structure, it can remain in the layer formed by the fluororesin (A).

Commercially available organic ultraviolet absorbers may, for example, be "Tinuvin (registered trademark) 326" (molecular weight: 315.8, melting point: 139° C.), "Tinuvin (registered trademark) 405" (molecular weight: 583.8, melting point: 74 to 77° C.), "Tinuvin (registered trademark) 460" (molecular weight: 629.8, melting point: 93 to 102° C.), "Tinuvin (registered trademark) 900" (molecular weight: 447.6, melting point: 137 to 141° C.) and "Tinuvin (registered trademark) 928" (molecular weight: 441.6, melting point: 109 to 113° C.), manufactured by BASF; "Sanduvor (registered trademark) VSU powder" (molecular weight: 312.0, melting point: 123 to 127° C.), manufactured by Clariant Corp.; "Hastavin (registered trademark) PR-25 Gran" (molecular weight: 250.0, melting point: 55 to 59° C.), manufactured by Clariant Corp.; etc.

The inorganic ultraviolet absorbers may, for example, be filler-type inorganic ultraviolet absorbers including ultraviolet absorbing oxides (zinc oxide, cerium oxide, etc.).

As the inorganic ultraviolet absorber, preferred may, for example, be composite particles of titanium oxide and zinc oxide, composite particles of titanium oxide and cerium oxide, composite particles of zinc oxide and cerium oxide, composite particles of titanium oxide, zinc oxide and cerium oxide, etc.

<Surface Conditioner>

The surface conditioner (also referred to as a leveling agent) is one having an effect to improve the surface smoothness of the cured film.

Commercially available surface conditioners may, for example, be "BYK (registered trademark)-361N", "BYK (registered trademark)-360P", "BYK (registered trademark)-364P", "BYK (registered trademark)-368P", "BYK (registered trademark)-3900P", "BYK (registered trademark)-3931P", "BYK (registered trademark)-3933P", "BYK (registered trademark)-3950P", "BYK (registered trademark)-3951P" and "BYK (registered trademark)-3955P", trade names, manufactured by BYK-Chemie, etc.

<Degassing Agent>

The degassing agent is one having an effect to prevent e.g. air contained in the powder paint, or a blocking agent, moisture, etc. in the case of using a blocked isocyanate curing agent as the curing agent, from remaining inside of the cured film. The degassing agent may, for example, be benzoin, etc.

<Plasticizer>

The plasticizer is one having an effect to improve the surface smoothness, adhesion to a substrate, impact resistance, etc. of the cured film. The plasticizer may, for example, be dicyclohexyl phthalate, hexabromocyclododecane, tri-benzoic acid glyceride, tetrabenzoic acid pentaerythritol, 1,4-cyclohexane dimethanol dibenzoate, etc.

[Painted Article]

A painted article has a cured film formed by the above-described powder paint on the surface of a substrate.

The material for the substrate is preferably a metal such as aluminum, iron, magnesium, etc., and aluminum is particularly preferred, since it is excellent in corrosion resistance and light in weight, and presents an excellent performance in application as building material.

The shape, size, etc. of the substrate, are not particularly limited.

The thickness of the cured film is not particularly limited, but is usually at most 200 μm, preferably from 1 to 100 μm.

The powder paint of the present invention is excellent in weather resistance, and thus can be used for the exterior of e.g. buildings which are exposed to harsh environments. For example, it can be used as the exterior of goods which are required to have high weather resistance, such as an outdoor unit of air conditioner, a pole of traffic signal, a sign board, etc. that are installed along the coast. The thickness of the cured film in these applications is preferably from 30 to 200 μm, more preferably 40 to 150 μm. The thickness of the cured film is measured by the method of JIS K5600-1-7 (2009).

The water contact angle of the cured film is preferably from 1 to 55°, particularly preferably from 3 to 50°. When the water contact angle of the cured film is at least the above lower limit value, the cured film is less likely to be eroded by organic acid components resulting from droppings of birds or dead bodies of insects, and occurrence of mold on the cured film surface can be prevented (occurrence of mold tends to lead to poor appearance). When the water contact angle of the cured film is at most the above upper limit value, the cured film is excellent in stain resistance.

The water contact angle of the cured film is obtained by measuring a contact angle upon dropping a droplet of water on the coating film in air, by using a contact angle meter (CA-X model, manufactured by Kyowa Interface Science Co., Ltd.).

In a case where the powder paint contains a non-fluororesin (E), the cured film formed by the powder paint may be in the form of one-layer structure wherein the fluororesin (A) and the non-fluororesin (E) are present as mixed, or may be in the form of a two-layer structure wherein the fluororesin (A) and the non-fluororesin (E) form separate layers. The two-layer structure is preferred, since the cured film will be further excellent in chemical resistance and weather resistance. A method for forming the cured film of such a two-layer structure may, for example, be the method as disclosed in WO2014/002964.

[Method of Producing Powder Paint]

The powder paint can be prepared by known methods. For example, the following methods may be mentioned.

Method I: A method wherein the raw materials i.e. the fluororesin (A), a metal salt for the metal element (B), the light stabilizer (C), the polymerization inhibitor (D), etc. are, respectively, preliminarily pulverized into powder, followed by mixing.

Method II: A method wherein the above raw materials are mixed in the solid state, followed by pulverization into powder.

Method III: A method wherein the above raw materials are mixed in the solid state, then melt-kneaded, and then cooled to a massive form, followed by pulverization into powder.

Among them, method III is preferred, since in the resulting powder, the respective components are uniformly distributed, whereby it is possible to obtain a cured film excellent in uniformity.

Otherwise, the metal salt for the metal element (B), the light stabilizer (C) and the polymerization inhibitor (D) may be added to the reaction solution during the polymerization reaction in the production of the fluororesin (A), or they may be added to the reaction solution after the polymerization reaction and before removing the solvent. However, in a case where the monomer raw material of the fluororesin (A) contains a chlorine-containing monomer, the polymerization inhibitor (D) is preferably added after the polymerization reaction, with a view to preventing occurrence of free Cl from the chlorine-containing monomer. The polymerization reaction may be carried out by a known method.

In a case where the metal salt for the metal element (B) and the light stabilizer (C) are added to the reaction solution during the polymerization reaction in the production of the fluororesin (A) or non-fluororesin (E), or immediately after the polymerization reaction, it is preferred that the solvent in the reaction mixture is thereafter removed. Removal of the solvent is carried out by a known technique such as vacuum drying.

Mixing of the raw materials can be conducted by using a known mixer. The type of the mixer may, for example, be a high-speed mixer, a V type mixer, an inversion mixer, etc.

Melt-kneading can be carried out by using an extruder of various types such as single screw, twin screw, planetary gear, etc. A mixture of the respective components is preferably kneaded in a heated and melted state, in order to mix the respective components uniformly. The melt-kneaded product extruded is preferably cooled and pelletized.

Pulverization of pellets can be conducted by using a known pulverizer. The type of the pulverizer may, for example, be a pin mill, a hammer mill, a jet mill, etc.

After the pulverization, it is preferred to carry out classification. In the case of carrying out classification, it is preferred to remove either particles with a size of less than 10 μm, or particles with a size exceeding 100 μm.

The average particle size of particles contained in the powder paint is, for example, preferably from about 20 to 60 μm, more preferably from 25 to 50 μm, by 50% average volume particle size distribution. The particle size is measured by using a particle size measuring instrument which is commonly used. The system of the particle size measuring instrument may, for example, be a system to capture a potential change at the time of passing through pores, a laser diffraction system, an image judgment system, a sedimentation rate measurement system, etc.

In a case where the powder paint of the present invention contains a non-fluororesin (E), or additives such as a curing agent, a pigment, a curing catalyst, an ultraviolet absorber, a surface controlling agent, etc., the mixing, melt kneading and pulverization thereof can be carried out in the same manner as described above.

(Method of Procuring Painted Article)

The painted article is produced by forming a cured film by the above-described powder paint on the surface of a substrate.

Formation of the cured film may be accompanied or may not be accompanied by a curing reaction of the fluororesin (A) and/or non-fluororesin (E) with a curing agent. For example, it is possible to form a cured film by applying a heated molten powder paint onto a substrate surface to form a coating film on the substrate surface, followed by cooling for solidification to room temperature (20 to 25° C.).

The method for applying the heated molten powder paint on the substrate surface, may be a method wherein the powder paint is heated and melted, and then applied onto the substrate surface, or a method wherein the powder paint is applied on the substrate surface, and then heated and melted. In the case of the method wherein the powder paint is heated and melted, and then applied onto the substrate surface, curing will proceed at the same time as the powder paint is heated and melted, and therefore, it is preferred to conduct the heating and melting immediately before the application.

The heating temperature (hereinafter referred to also as "baking temperature") and the heating retention time (hereinafter referred to also as "baking time") for heating and melting the powder paint and maintaining its molten state for a predetermined time, are suitably set depending upon the types and composition of raw material components of the powder paint, the film thickness, etc. of the desired cured film, etc.

In particular, the baking temperature is preferably set depending on the reaction temperature of the curing agent to be used. For example, in the case of using a blocked polyisocyanate curing agent as the curing agent, the baking temperature is preferably from 170 to 210° C., more preferably from 180 to 200° C. The baking time is preferably from 5 to 120 minutes, particularly preferably from 10 to 60 minutes.

Cooling after the baking may be either rapid cooling or slow cooling, but slow cooling is preferred, in that interfacial peeling due to the difference in curing shrinkage between the layer formed by the fluororesin (A) and the layer formed by the non-fluororesin (E) is thereby less likely. The slow cooling rate is from 1 to 30° C./min, preferably from 2 to 20° C./min.

As the coating method, it is possible to use an electrostatic coating method, an electrostatic spraying method, an electrostatic immersion method, a misting method, a fluidized bed coating method, a blowing method, a spraying method, a thermal spraying method, a plasma spraying method, etc.

An electrostatic coating method using a powder coating gun is preferred in that even when the cured film is made thin, the cured film is excellent in smoothness, and further in that the cured film is excellent in concealing properties. The powder coating gun may, for example, be a corona charging type spray gun or a triboelectric charging type spray gun. The corona charging type spray gun is one whereby the powder paint is subjected to corona discharge treatment and sprayed, and the triboelectric charging type coating gun is one whereby the powder paint is subjected to triboelectric charging treatment and sprayed.

The ejection amount of the powder paint from the powder coating gun is preferably set to be from 50 to 200 g/min, more preferably from 55 to 180 g/min. The distance from the tip of the gun portion of the powder coating gun to the substrate is preferably set to be from 150 to 400 mm, more preferably from 200 to 350 mm, from the viewpoint of coating efficiency, At the time of ejecting the powder paint from the corona charging type coating gun for coating, the load voltage to be applied to the components constituting the powder paint by the corona discharge treatment, is set to be preferably from −50 to −100 KV, further preferably from −60 to −80 KV from the viewpoint of excellent coating efficiency (the deposition rate of the powder paint on the substrate) and excellent appearance of the cured film.

On the other hand, at the time of ejecting the powder paint from the triboelectric charging type coating gun, the triboelectric charging treatment is carried out so that the internally generated current value of the powder paint will be preferably from 1 to 8 $\mu$A, more preferably from 1.1 to 7 $\mu$A from the viewpoint of excellent coating efficiency and excellent appearance of the cured film.

In a case where the electrostatic coating method is to be industrially implemented, for example, in order to set and ground a non-coated mirror, a grounded conductive horizontal belt conveyor is installed in a coating chamber, and a gun is set at an upper portion in the coating chamber. Here, the painting pattern width is preferably from 50 to 500 mm, the operating speed of the gun is preferably from 1 to 30 m/m in, and the conveyor speed is preferably from 1 to 50 m/min, and from the above preferred ranges, suitable conditions may be selected for use depending upon the particular purpose.

As a method of forming a cured film having a relatively thick thickness, a fluidized bed coating method is preferred. In the fluidized bed coating method, a substrate having a surface to be coated, heated to a temperature of at least the melting temperature of the powder paint, is dipped in a fluidized bed in which the powder flowing as carried by a gas such as air, is accommodated, to let the powder deposit on the surface to be coated of the substrate, and be melted thereby to let a coating film having a predetermined thickness be formed on the substrate, whereupon the coated substrate is taken out from the fluidized bed, and in some cases, the molten state of the coating film is maintained for a predetermined period of time. Thereafter, the coating film in the molten state is preferably cooled and solidified to obtain the substrate having a cured film formed thereon. The thickness of the cured film to be formed in the fluidized bed coating method, is not particularly limited, but is preferably from 100 to 1,000 $\mu$m, more preferably from 150 to 900 $\mu$m.

The temperature in the fluidized bed in the fluidized bed coating method is preferably from 15 to 55° C., and the temperature of the gas such as air blown into the bed in order to fluidize the powder, is also preferably from 15 to 55° C. The temperature of at least the surface to be coated, of the substrate at the time of dipping in the fluidized bed, is preferably from 300 to 450° C., and the time for dipping the substrate in the fluidized bed is preferably from 1 to 120 seconds. The substrate taken out from the fluidized bed is preferably maintained at a temperature of from 150 to 250° C. for from 1 to 5 minutes and then cooled to room temperature.

As described above, according to the powder paint of the present invention, increase in the molecular weight of the fluororesin at the time of producing the powder paint composition can be suppressed, whereby a cured film formed therefrom is less likely to have abnormal appearance such as orange peel.

EXAMPLES

Now, the present invention will be described in detail with reference to Examples, but the present invention is by no means limited to these Examples.

[Measuring Methods]

<Fluororesin Content>

1 g of a powder paint was dissolved in butyl acetate, and a pigment content was precipitated by centrifugal separation. The supernatant was dried to recover the resin component.

The recovered resin component was measured by $^{13}$C-NMR to determine the fluororesin content.

The measurement conditions by $^{13}$C-NMR are as follows.

Measuring device: digital NMR AVANCE III 400, manufactured by Bruker Corp.

Measurement method: NOESY (pulse width 30°, relaxation time: 10 seconds)

Measurement solvent: deuterated chloroform ($CDCl_3$)

Measurement temperature: room temperature

<Content of Free Chlorine Atoms (Free Cl)>

1 g of a powder paint was dissolved in 5 mL of toluene, and then, 3 mL of ultrapure water was added thereto, followed by shaking vigorously for three minutes.

Further, by means of a centrifugal separator, a separation operation was carried out at 12,000 rpm for 10 minutes.

After removing the toluene layer, water of the lower layer was diluted 10 times, and the content of freed chlorine atoms was measured by an ion chromatograph (ICS-3000, manufactured by Thermo Fisher Co.) to calculate the content relative to the fluororesin.

<Metal Element Content>

0.5 g of a powder paint was put in a platinum crucible and ashed by heating in an electric furnace. Then, it was dissolved in 1N nitric acid and diluted with 19 mL of ultrapure water, whereupon the metal element content was measured by an atomic absorption spectrometry (AA-7000F, manufactured by Shimadzu Corporation) to calculate the content relative to the fluororesin.

<Contents of Light Stabilizer and Polymerization Inhibitor>

With respect to a powder paint, by means of an ion chromatography, the contents of a light stabilizer and a polymerization inhibitor were measured under the following conditions, to calculate the respective contents relative to the fluororesin.

Measuring device: manufactured by Agilent Technologies Inc. (Agilent 1280 HPLC/6460MS)

Column: cadenza CD-C18 (2 mmφ×100 mm), manufactured by Imtakt Co.,

Eluent: 0.1 vol % formic acid aqueous solution

Flow rate: 0.3 mL/min

Column oven: 35° C.

Detector: UV280 nm

<Production Stability of Powder Paint>

Production stability of a powder paint was evaluated as follows.

The powder paint was melt-kneaded by a twin-screw extruder (16 mm extruder, manufactured by Thermo Prism Ltd.) at a barrel set temperature of 120° C.

Before and after the melt-kneading, the number average molecular weight of the fluororesin was measured by GPC (HLC-8220, manufactured by Tosoh Corporation). Based on the following formula (3), the rate of increase in the number average molecular weight of the fluororesin after melt-kneading to the number average molecular weight of the fluororesin before melt-kneading (hereinafter referred to simply as "increase rate") is determined, and the production stability was evaluated by the following evaluation standards.

$$\text{Increase rate (\%)} = [(\text{number average molecular weight of fluororesin after melt-kneading})/(\text{number average molecular weight of fluororesin before melt-kneading})] \times 100 \quad (3)$$

"Evaluation Standards"

○ (Good): The increase rate is less than 120%.

X (Bad): The increase rate is 120% or more.

Example 1

Production of Powder Paint

Into a stainless steel autoclave having an inner volume of 250 mL, equipped with a stirrer, 51.2 g of cyclohexyl vinyl ether, 13.3 g of 4-hydroxybutyl vinyl ether, 55.8 g of xylene, 15.7 g of ethanol, 5.82 g of potassium carbonate, 0.7 g of a 50 mass % xylene solution of tert-butyl peroxypivalate and 63 g of chlorotrifluoroethylene (CTFE) were introduced. The temperature was gradually raised, and after reaching 55° C., that temperature was maintained for 20 hours. After that, the temperature was raised to 65° C. and kept for 5 hours. Then, after cooling to room temperature, 0.39 g of a hindered amine light stabilizer (Tinuvin™ 144, manufactured by BASF), and 0.13 g of hydroquinone as a polymerization inhibitor were added and stirred for 1 hour. Thereafter, the residue was removed by filtration, followed by vacuum drying to obtain a powder paint (1).

The contents of free Cl, metal elements, the light stabilizer and the polymerization inhibitor, in the obtained powder paint (1), the number average molecular weight of the fluororesin before melt-kneading, and the production stability of the powder paint, were evaluated in accordance with the above-described procedures.

<Appearance Evaluation of Cured Film>

38.0 g of the powder paint (1), 11.0 g (INDEX=1) of a blocked isocyanate curing agent ("VESTAGON (registered trademark) B1530", manufactured by Evonik) as a curing agent, 0.4 g of benzoin as a degassing agent, 1.1 g of a powder coating leveling agent ("BYK (registered trademark)-360P", manufactured by BYK-Chemie) as a surface modifier, 0.005 g of a dibutyltin dilaurate solution in xylene (10,000-fold diluted product) as a curing catalyst, and 35.0 g of titanium oxide ("Ti-Pure (registered trademark) R960", manufactured by DuPont, titanium oxide content: 89 mass %) as a pigment, were mixed in a powder state by using a high speed mixer, to obtain a mixture.

Then, the obtained mixture was melt-kneaded by means of a twin-screw extruder (16 mm extruder, manufactured by Thermo Prism Ltd.) at a barrel set temperature of 120° C., to obtain pellets.

Then, the obtained pellets were pulverized at room temperature by using a pulverizer and subjected to classification with a mesh to obtain a powder paint (1'). The average particle size of the powder paint (1') was about 40 μm.

Here, the average particle size is one obtained by calculation from the 50% average volume particle size distribution and was measured and evaluated by means of Helos-Rodos, manufactured by Sympatec.

Using the powder coating (1') thus obtained, a test specimen was prepared. As a base material, an aluminum substrate was used. The surface of the aluminum substrate was subjected to chromate treatment.

On one surface of the aluminum substrate, electrostatic coating was applied by means of an electrostatic coating machine (trade name: GX3600C, manufactured by Onoda Cement Corporation), and held in a 200° C. atmosphere for 20 minutes, followed by cooling to room temperature, to obtain a test specimen having a cured film with a thickness of from 55 to 65 μm formed.

Using the obtained test specimen, the condition of the surface was visually observed, and the appearance of the cured film was evaluated by the following evaluation standards.

"Evaluation Standards"

○ (Excellent): The cured film was excellent in surface smoothness, and surface irregularities, repelling, defect in wettability to the substrate, etc. were not observed.

Δ (Good): The cured film was excellent in surface smoothness, but foreign matters or dullness and further bleeding out of additive components on the surface of the cured film, were observed.

X (Bad): The cured film was poor in surface smoothness, and surface irregularities, repelling, defect in wettability to the substrate, etc. were observed.

The measurement results and evaluation results in Example 1 are shown in Table 1 together with the results in Examples 2 to 9 and Comparative Examples 1 to 3.

TABLE 1

|  | Ex. 1 | Ex. 2 | Ex. 3 | Ex. 4 | Ex. 5 | Ex. 6 |
|---|---|---|---|---|---|---|
| Potassium content (mass ppm) | 22.0 | 21.0 | — | 5.0 | 40.0 | 22.0 |
| Sodium content (mass ppm) | — | — | 20 | — | — | — |
| Content of freed chlorine atoms (mass ppm) | 5.1 | 4.9 | 5.1 | 3.0 | 5.0 | 5.1 |
| Free Cl/B (mass ratio) | 4.3 | 4.3 | 3.9 | 1.7 | 8.0 | 4.3 |
| Content of light stabilizer (mass ppm) | 2,800 | 2,900 | 2,600 | 2,800 | 2,800 | 250 |
| Content of polymerization inhibitor (mass ppm) | 950 | 1,000 | 920 | 950 | 950 | 950 |
| Number average molecular weight of fluororesin before melt-kneading | 20,000 | 20,000 | 20,000 | 20,000 | 20,000 | 20,000 |
| Production stability of powder paint | ○ | ○ | ○ | ○ | ○ | ○ |
| Appearance of cured film | ○ | ○ | ○ | ○ | ○ | Δ |

|  | Ex. 7 | Ex. 8 | Ex. 9 | Comp. Ex. 1 | Comp. Ex. 2 | Comp. Ex. 3 |
|---|---|---|---|---|---|---|
| Potassium content (mass ppm) | 22.0 | 22.0 | 22.0 | 1.7 | 20.0 | 19.0 |
| Sodium content (mass ppm) | — | — | — | — | — | — |
| Content of freed chlorine atoms (mass ppm) | 5.1 | 5.1 | 5.1 | 5.0 | 5.1 | 20.3 |
| Free Cl/B (mass ratio) | 4.3 | 4.3 | 4.3 | 0.34 | 3.9 | 0.9 |
| Content of light stabilizer (mass ppm) | 1,000 | 5,000 | 2,800 | 2,500 | — | 3,000 |
| Content of polymerization inhibitor (mass ppm) | 950 | 950 | 950 | 960 | 980 | — |
| Number average molecular weight of fluororesin before melt-kneading | 20,000 | 20,000 | 20,000 | 20,000 | 20,000 | 20,000 |
| Production stability of powder paint | ○ | ○ | ○ | X | X | X |
| Appearance of cured film | ○ | Δ | ○ | X | X | X |

Example 2

A powder paint (2) was obtained in the same manner as in Example 1 except that 5.82 g of potassium carbonate was changed to 2.36 g of potassium hydroxide. The contents of the respective components and the number average molecular weight of the fluororesin before and after the melt-kneading were measured, and the production stability of the powder paint (2) was evaluated. Further, in the same manner as in Example 1, a powder paint (2') was obtained, then, a test specimen was prepared, and the appearance of the cured film was evaluated.

Example 3

A powder paint (3) was obtained in the same manner as in Example 1 except that 5.82 g of potassium carbonate was changed to 1.68 g of potassium hydroxide. The contents of the respective components and the number average molecular weight of the fluororesin before and after the melt-kneading were measured, and the production stability of the powder paint (3) was evaluated. Further, in the same manner as in Example 1, a powder paint (3') was obtained, then, a test specimen was prepared, and the appearance of the cured film was evaluated.

Examples 4 and 5

Powder paints (4) and (5) were obtained in the same manner as in Example 1 except that 5.82 g of the addition amount of potassium carbonate was changed to 1.32 g and 10.58 g, respectively. The contents of the respective components and the number average molecular weights of the Fluororesins before and after the melt-kneading were measured, and the production stability of the powder paints (4) and (5) was evaluated. Further, in the same manner as in Example 1, powder paints (4') and (5') were obtained, then test specimens were prepared, and the appearance of the cured films was evaluated.

Examples 6 to 8

Powder paints (6) to (8) were obtained in the same manner as in Example 1 except that 0.39 g of the hindered amine light stabilizer was changed to 0.03 g, 0.14 g, and 0.70 g, respectively. The contents of the respective components and the number average molecular weights of the Fluororesins before and after the melt-kneading were measured, and the production stability of the powder paints (6) to (8) was evaluated. Further, in the same manner as in Example 1, powder paints (6') to (8') were obtained, then test specimens were prepared, and the appearance of the cured films was evaluated.

Example 9

A powder paint (9') was prepared in the same manner as in Example 1 except that to the powder paint (1'), 16.0 g of a polyester resin ("CRYLCOAT (registered trademark) 4890-0", manufactured by DAICEL-ALLNEX LTD., weight average molecular weight: 4,400, number average molecular weight: 2,500, hydroxyl value: 30 mgKOH/g) was further added as a non-fluororesin. Then, a test specimen was prepared, and the appearance of the cured film was evaluated.

Comparative Example 1

A powder paint (10) was obtained in the same manner as in Example 1 except that the addition amount of potassium carbonate was changed from 5.82 g to 0.5 g. The contents of the respective components and the number average molecular weight of the fluororesin before and after the melt-kneading were measured, and the production stability of the powder paint was evaluated. Further, in the same manner as in Example 1, a powder paint (10') was obtained, then a test specimen was prepared, and the appearance of the cured film was evaluated.

Comparative Example 2

A powder paint (11) was obtained in the same manner as in Example 1 except that a hindered amine light stabilizer was not used. The contents of the respective components and the number average molecular weight of the fluororesin before and after the melt-kneading were measured, and the production stability of the powder paint (11) was evaluated. Further, in the same manner as in Example 1, a powder paint (11') was obtained, then a test specimen was prepared, and the appearance of the cured film was evaluated.

Comparative Example 3

A powder paint (12) was obtained in the same manner as in Example 1 except that no hydroquinone was used. The contents of the respective components and the number average molecular weight of the fluororesin before and after the melt-kneading were measured, and the production stability of the powder paint was evaluated. Further, in the same manner as in Example 1, a powder paint (12') was obtained, then a test specimen was prepared, and the appearance of the cured film was evaluated.

The results of the measurements and evaluations in the above Examples 2 to 9 and Comparative Examples 1 to 3 are shown in Table 1.

As shown in Table 1, the molecular weights of the Fluororesins before the melt-kneading in Examples 1 to 9 and Comparative Examples 1 to 3 were the same.

Further, the powder paints in Examples 1 to 9 showed a low increase in the molecular weight after the melt-kneading and thus were excellent in the production stability. In contrast, the powder paints in Comparative Example 1 wherein the content of potassium atoms or sodium atoms was small, in Comparative Example 2 wherein no light stabilizer was contained, and in Comparative Example 3 wherein no polymerization inhibitor was contained, showed a high increase in the molecular weight after the melt kneading and thus were inferior in the production stability.

Further, the cured films formed from the powder paints in Examples 1 to 9 were free from occurrence of orange peel, and the cured films were excellent in appearance. In contrast, the cured films formed from the powder paints in Comparative Example 1 wherein the content of potassium atoms or sodium atoms was small, in Comparative Example 2 wherein no light stabilizer was contained, and in Comparative Example 3 wherein no polymerization inhibitor was contained, had occurrence of orange peel, and the cured films were poor in appearance.

INDUSTRIAL APPLICABILITY

A painted article having a cured film formed by using a powder paint of the present invention is excellent in surface smoothness, has no abnormal appearance such as orange peel, and has high weather resistance, anti-fouling property, etc., whereby it is useful for e.g. exterior building materials such as radio steel towers, power pylons, guardrails, automobiles, railway vehicles or aircrafts, traffic signal poles, sign boards, etc.

What is claimed is:
1. A powder paint, comprising:
   a fluororesin (A),
   at least one metal element (B) selected from the group consisting of potassium, sodium and magnesium in an amount of from 2 to 60 mass ppm relative to the fluororesin (A),
   a light stabilizer (C) in an amount of from 10 to 10,000 mass ppm relative to the fluororesin (A),
   a polymerization inhibitor (D) in an amount of from 100 to 5,000 mass ppm relative to the fluororesin (A), and
   free chlorine atoms with a mass ratio of the metal element (B) to the free chlorine atoms of from 1.0 to 10.0.
2. The powder paint according to claim 1, wherein the fluororesin (A) is at least one member selected from the group consisting of a polyvinylidene fluoride and a copolymer containing units based on a fluoroolefin and units having a reactive group.
3. The powder paint according to claim 1, wherein the fluororesin (A) is a fluororesin having a glass transition temperature of at least 30° C.

4. The powder paint according to claim 1, wherein the fluororesin (A) has a number average molecular weight of from 3,000 to 50,000.

5. The powder paint according to claim 1, wherein an amount of the free chlorine atoms ranges from 0.1 to 30 mass ppm relative to the fluororesin (A).

6. The powder paint according to claim 1, further comprising:
   a non-fluororesin (E) in an amount of from 10 to 400 parts by mass per 100 parts by mass of the fluororesin (A).

7. The powder paint according to claim 1, wherein the light stabilizer (C) is a hindered amine light stabilizer having a molecular weight of from 300 to 5,000 and a melting point of from 50 to 250° C.

8. The powder paint according to claim 1, wherein the polymerization inhibitor (D) is a hydroquinone.

9. The powder paint according to claim 6, wherein the non-fluororesin (E) is an acrylic resin or a polyester resin.

10. A painted article, comprising:
    a cured film of the powder paint according to claim 1 on a substrate surface.

11. The painted article according to claim 10, wherein the cured film has a thickness of from 100 to 1,000 μm.

12. The painted article according to claim 10, wherein the cured film has a water content angle of from 1 to 55°.

* * * * *